(12) United States Patent
Hao et al.

(10) Patent No.: US 12,177,556 B2
(45) Date of Patent: Dec. 24, 2024

(54) PHOTOGRAPHING CONTROL METHOD, MOBILE PLATFORM, CONTROL DEVICE, AND STORAGE MEDIUM

(71) Applicant: SZ DJI TECHNOLOGY CO., LTD., Shenzhen (CN)

(72) Inventors: Yi Hao, Shenzhen (CN); Tie Su, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 171 days.

(21) Appl. No.: 17/235,867

(22) Filed: Apr. 20, 2021

(65) Prior Publication Data

US 2021/0243357 A1 Aug. 5, 2021

Related U.S. Application Data

(63) Continuation of application No. PCT/CN2018/113007, filed on Oct. 31, 2018.

(51) Int. Cl.
H04N 23/62 (2023.01)
H04N 23/66 (2023.01)
H04N 23/67 (2023.01)
B64U 10/13 (2023.01)
B64U 101/30 (2023.01)
H04N 23/68 (2023.01)

(52) U.S. Cl.
CPC ............. H04N 23/62 (2023.01); H04N 23/66 (2023.01); H04N 23/67 (2023.01); B64U 10/13 (2023.01); B64U 2101/30 (2023.01); H04N 23/682 (2023.01)

(58) Field of Classification Search
None
See application file for complete search history.

(56) References Cited

U.S. PATENT DOCUMENTS

2013/0162822 A1 6/2013 Lee et al.
2016/0070261 A1 3/2016 Heilman et al.
(Continued)

FOREIGN PATENT DOCUMENTS

CN 105282420 A 1/2016
CN 105391939 A 3/2016
(Continued)

OTHER PUBLICATIONS

The World Intellectual Property Organization (WIPO) International Search Report for PCT/CN2018/113007 Jul. 29, 2019 7 Pages (including translation).

Primary Examiner — Heather R Jones
(74) Attorney, Agent, or Firm — ANOVA LAW GROUP, PLLC

(57) ABSTRACT

A photographing control method includes receiving a photographing parameter for a trajectory point from a control terminal, obtaining mobile-platform attitude data for the trajectory point, establishing a correspondence relationship between the photographing parameter for the trajectory point and the mobile-platform attitude data for the trajectory point, and, in response to detecting that a current operation attitude of a mobile platform matches the mobile-platform attitude data for the trajectory point, controlling a photographing device of the mobile platform to perform photographing according to the photographing parameter.

20 Claims, 6 Drawing Sheets

(56) References Cited

U.S. PATENT DOCUMENTS

| | | | | |
|---|---|---|---|---|
| 2017/0083027 A1* | 3/2017 | Tao | ................ | B64C 39/024 |
| 2018/0241936 A1* | 8/2018 | Li | ................ | G05D 1/0038 |
| 2018/0359411 A1* | 12/2018 | Kohstall | ................ | H04N 5/232 |
| 2019/0094863 A1* | 3/2019 | Silva | ................ | G08G 5/045 |
| 2020/0066162 A1* | 2/2020 | Streem | ................ | G08G 5/0039 |

FOREIGN PATENT DOCUMENTS

| | | | | |
|---|---|---|---|---|
| CN | 106603901 A | | 4/2017 | |
| CN | 107077152 A | | 8/2017 | |
| CN | 107087427 A | | 8/2017 | |
| CN | 107360365 A | | 11/2017 | |
| CN | 108174096 A | | 6/2018 | |
| CN | 108496349 A | | 9/2018 | |
| GB | 2553631 A | * | 3/2018 | .......... G06T 7/0004 |
| JP | 2017062529 A | | 3/2017 | |

\* cited by examiner

US 12,177,556 B2

PHOTOGRAPHING CONTROL METHOD, MOBILE PLATFORM, CONTROL DEVICE, AND STORAGE MEDIUM

CROSS-REFERENCE TO RELATED APPLICATION

This application is a continuation of International Application No. PCT/CN2018/113007, filed Oct. 31, 2018, the entire content of which is incorporated herein by reference.

TECHNICAL FIELD

The present disclosure relates to the field of telecommunication technologies and, more particularly, to a photographing control method, a mobile platform, a control device, and a storage medium.

BACKGROUND

A usual method for using a mobile platform for time-lapse photographing and trajectory photographing is to fix the photographing device on a gimbal and control the rotation of the gimbal to complete the photographing of different photographing scenes. After the photographing is started, photographing parameters of the photographing device cannot be adjusted. In this case, the photographing parameters of the photographing device during photographing are automatically adjusted by the photographing device according to the photographing scene. This may cause that the image effect of the final image captured by the photographing device is not what the user expects. Therefore, in the field of photographing using a mobile platform, there is an urgent need for an effective photographing control method to dynamically adjust photographing parameters to obtain expected photographing images.

SUMMARY

In accordance with the disclosure, there is provided a photographing control method including receiving a photographing parameter for a trajectory point from a control terminal, obtaining mobile-platform attitude data for the trajectory point, establishing a correspondence relationship between the photographing parameter for the trajectory point and the mobile-platform attitude data for the trajectory point, and, in response to detecting that a current operation attitude of a mobile platform matches the mobile-platform attitude data for the trajectory point, controlling a photographing device of the mobile platform to perform photographing according to the photographing parameter.

Also in accordance with the disclosure, there is provided a mobile platform including a photographing device, a memory storing program codes, and a processor configured to execute the program codes to receive a photographing parameter for a trajectory point from a control terminal, obtain mobile-platform attitude data for the trajectory point, establish a correspondence relationship between the photographing parameter for the trajectory point and the mobile-platform attitude data for the trajectory point, and, in response to detecting that a current operation attitude of the mobile platform matches the mobile-platform attitude data for the trajectory point, control the photographing device to perform photographing according to the photographing parameter.

Also in accordance with the disclosure, there is provided a control device including a memory storing program codes and a processor configured to execute the program codes to set a current position of a mobile platform as a trajectory point in response to detecting a trajectory point selection operation, set a photographing parameter for the trajectory point in response to detecting a photographing parameter setting operation for the trajectory point, and send the photographing parameter for the trajectory point to the mobile platform.

BRIEF DESCRIPTION OF THE DRAWINGS

The above and/or additional aspects and advantages of this disclosure will become obvious and easy to understand from the description of the embodiments in conjunction with the following drawings.

DETAILED DESCRIPTION OF THE EMBODIMENTS

Figure 1:
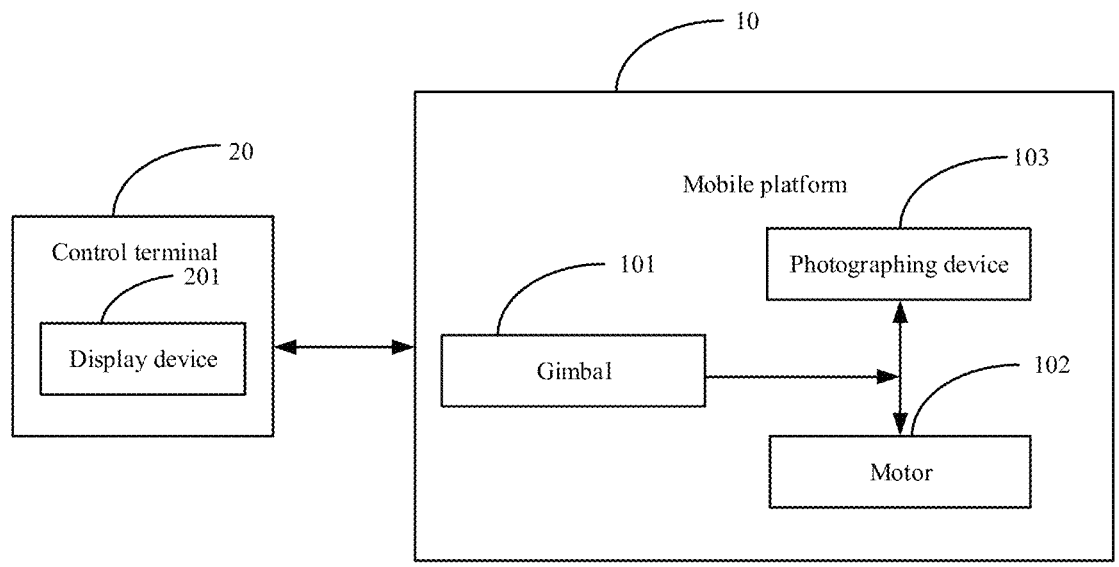
FIG. 1 is a schematic structural diagram of an exemplary photographing control system consistent with various embodiments of the present disclosure.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Example embodiments will be described with reference to the accompanying drawings, in which the same numbers refer to the same or similar elements unless otherwise specified.

As used herein, when a first assembly is referred to as "fixed to" a second assembly, it is intended that the first assembly may be directly attached to the second assembly or may be indirectly attached to the second assembly via another assembly. When a first assembly is referred to as "connecting" to a second assembly, it is intended that the first assembly may be directly connected to the second assembly or may be indirectly connected to the second assembly via a third assembly between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

The present disclosure provides a photographing control method. The photographing control method can be applied to a mobile platform. The mobile platform may be equipped with a photographing device and the photographing control method may be mainly used to set photographing parameters of the photographing device in the mobile platform. Then the mobile platform may control the photographing device to photograph with the set photographing parameters, such that the photographing device can photograph an image that meets the expected effect. The mobile platform may include at least one of an unmanned aerial vehicle or a car. In this disclosure, the meaning of the phrase "photographing parameter" may also include the value of the photographing parameter. Therefore, for example, obtaining/setting/sending a photographing parameter may refer to obtaining/setting/sending the value of the photographing parameter.

In one embodiment, the mobile platform may further include a gimbal, and the photographing device may be fixed at the mobile platform through the gimbal. The photographing device may be prevented from shaking when the mobile platform shakes and affecting the photographing effect. After starting time-lapse video or trajectory photographing, the mobile platform may control the gimbal to ensure the stability of the photographing device. Specifically, the mobile platform may use inertial sensors and/or gyroscopes to detect the attitude of the mobile platform, and control attitude of the gimbal based on the detected attitude of the mobile platform to offset the influence of the shake of the mobile platform on the stability of the photographing device, such that the photographing device is always in a stable state. After the photographing device starts photographing, the mobile platform may control the gimbal to ensure the stability of the photographing device. If the photographing parameters of the photographing device are adjusted at this time, the photographing device will shake, which will affect the final photographing effect. The photographing parameters of the photographing device may only be adjusted before the photographing device starts photographing. However, because the photographing scenes to be photographed by the photographing device are different, the photographing parameters set before photographing may not be suitable for all photographing scenes. Therefore, the photographing parameter control method provided by the embodiments of the present disclosure realizes that before the photographing device performs photographing, corresponding photographing parameters are set for each different photographing scene to obtain the expected photographing image.

It should be noted that the different photographing scenes captured by the photographing device means that the images to be photographed are different. Intersection of two diagonal lines in the image to be photographed is called a trajectory point of the mobile platform. That is, when the mobile platform moves to different trajectory points, the images captured by the photographing device may be different.

One embodiment of the present disclosure provides a photographing parameter control system. As illustrated in FIG. 1, the photographing parameter control system includes a mobile platform 10 and a control terminal 20. The mobile platform 10 is connected to the control terminal 20. The mobile platform 10 includes a gimbal 101, a motor 102, and a photographing device 103. The photographing device 103 is mounted at the gimbal 101. The control terminal 20 may be one or more of terminal devices such as cell phones, computers, or parameter adjustment screens. The mobile platform 10 may be connected to the control terminal 20 through wireless manner, Bluetooth, or other methods. The control terminal 20 is mainly configured to set the photographing parameters of the photographing device. The control terminal 20 may include a display device 201. The photographing device 103 is mainly used for monitoring the mobile environment of the mobile platform 10, time-lapse photography, or trajectory photography. In the embodiments of the present disclosure, the photographing device 103 is mainly used for time-lapse photography and trajectory photography.

The gimbal 101 is used to carry the photographing device 103 and the motor 102 is connected to the photographing device 103. The mobile platform 10 can adjust the photographing parameters of the photographing device 103 by controlling the motor 102. In other embodiments, the mobile platform 10 can also adjust the photographing parameters of the photographing device 103 by controlling the photographing device 103.

Figure 2:
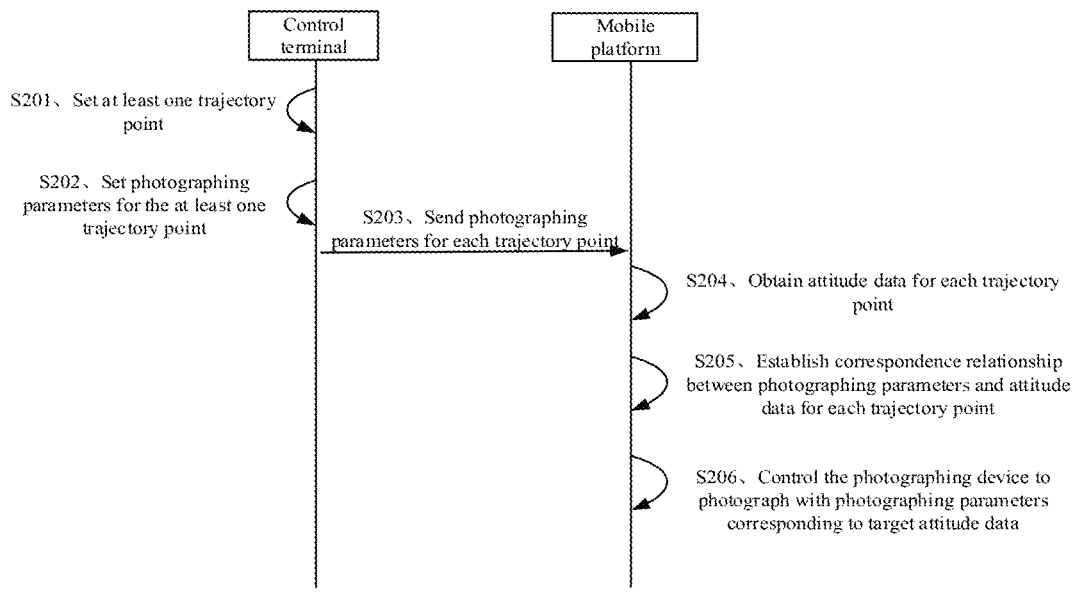
FIG. 2 is a flow chart of an exemplary photographing control method consistent with various embodiments of the present disclosure.

In one embodiment, a workflow of the photographing parameter control system in FIG. 1 is shown in FIG. 2. As shown in FIG. 2, at S201, the control terminal 20 sets multiple trajectory points for the mobile platform 10 according to the received trajectory point selection operation. When receiving the photographing parameter setting operation on the trajectory points, the control terminal 20 sets the corresponding photographing parameters (e.g., sets the values of the photographing parameters) for each trajectory point at S202, and then at S203, the photographing parameters for each trajectory point are sent to the mobile platform 10. The mobile platform 10 stores the received photographing parameters for each trajectory point in a database, and then obtains the pre-stored attitude data for each trajectory point at S204. The attitude data concerns attitude of the mobile platform 10 and is also referred to as "mobile-platform attitude data." Further, the mobile platform 10 establishes the correspondence relationship between the photographing parameters for each trajectory point and the attitude data for each trajectory point at S205 according to the received photographing parameters for each trajectory point and the obtained attitude data for each trajectory point, and the mobile platform 10 can control the photographing device to photograph at different trajectory points with photographing parameters corresponding to the trajectory points. Specifically, the mobile platform monitors the operation attitude of the mobile platform 10 in real time. When it is detected that the current operation attitude matches a target attitude, the target attitude data is determined to be the attitude data corresponding to any one of the aforementioned trajectory points. Then, the photographing parameter corresponding to the target attitude data is found through the correspondence between the photographing parameters for each trajectory point and the attitude data for each trajectory point. Correspondingly, at S206, the mobile platform 10 controls the photographing device to photograph with the photographing parameter corresponding to the target attitude data. The photographing parameters of the photographing device may be adjusted dynamically according to the photographing scenes and the photographing efficiency may be improved.

The present disclosure also provides a photographing control method executed by the mobile platform or the control terminal provided by various embodiments of the present disclosure.

Figure 3:
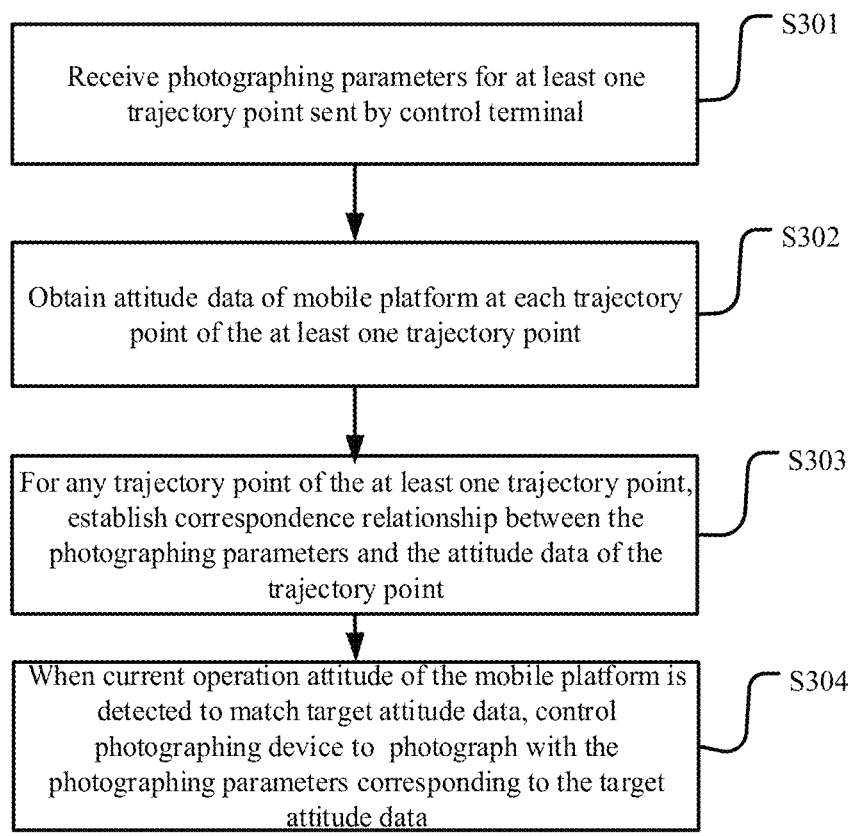
FIG. 3 is a flow chart of another exemplary photographing control method consistent with various embodiments of the present disclosure.

As illustrated in FIG. 3, one embodiment of the present disclosure provides a photographing control method. The photographing control method can be applied to the photographing parameter control system in FIG. 1 and the workflow shown in FIG. 2. The photographing control method in FIG. 3 can be executed by the mobile platform, and includes S301 to S304.

At S301, photographing parameters about at least one trajectory point sent by the control terminal are received.

In one embodiment, a trajectory point may be an intersect of two diagonal lines of the image to be photographed. The photographing parameters may refer to the parameters of the photographing device of the mobile platform when photographing images, and may include one or more of focus, focal length, or exposure value. In one embodiment of the present disclosure, any trajectory point in the at least one trajectory point of the mobile platform may be set by the control terminal when the trajectory point selection operation is received. The photographing parameters of any trajectory point in the at least one trajectory point may be set by the control terminal when the control terminal receives the photographing parameter setting operation corresponding to the trajectory point. When the mobile platform receives the photographing parameters of the at least one trajectory point, it can be achieved when the mobile platform moves to one trajectory point of the at least one trajectory point, the mobile platform can control the photographing device to photograph with the photographing parameters corresponding to the trajectory point, such that the expected photographing image can be obtained.

For example, the photographing parameters of at least one trajectory point received by the mobile platform may include "for the first trajectory point, the focus is XX, the focal length is XX, and the exposure value is XX; for the second trajectory point, the focus is XX, and the focal length is XX; for the third trajectory point, the focus is XX, the focal length is XX, and the exposure value is XX . . . ."

At S302, the attitude data of the mobile platform at each trajectory point in the at least one trajectory point is obtained.

In one embodiment, the attitude data for each trajectory point in the at least one trajectory point may be the attitude data of the mobile platform when the mobile platform moves to the trajectory point. The attitude data may include horizontal attitude data and/or vertical attitude data. The horizontal attitude data refers to the angle, translation distance, or operation speed of the mobile platform in the horizontal direction. The vertical attitude data refers to the vertical angle, translation distance, or operation speed of the mobile platform in the vertical direction. The above-mentioned attitude data may be collected by attitude sensors. The attitude sensors may include inertial sensors or gyroscopes. The inertial sensors may be mainly used to detect and measure acceleration, tilt, shock, vibration or other data. The gyroscopes are also called angular motion detection devices and may be mainly used to measure the angle.

In one embodiment, the mobile platform may store the correspondence relationship between the at least one trajectory point and the attitude data. At S302, obtaining the attitude data of the mobile platform at each trajectory point in the at least one trajectory point may include: collecting the attitude data of the mobile platform at each trajectory point of the at least one trajectory point through the attitude sensors. Each trajectory point of the at least one trajectory point may be determined by the control terminal when the control terminal detects the trajectory point selection operation.

In one embodiment, a manner that the mobile platform sets the correspondence relationship between the at least one trajectory point and the attitude data may be as follows. A user may control the mobile platform to move through a control device matched with the mobile platform, and the control terminal may use the display device of the control terminal to display the operating status of the mobile platform. The user can view the real-time movement status of the mobile platform through the display device. When the mobile platform moves to a trajectory point of the at least one trajectory point, the user may use a remote control device matching the mobile platform such as a remote control to adjust the attitude of the mobile platform, and perform the confirmation operation to confirm the attitude of the mobile platform after the adjustment is finished. At this time, the control terminal may send the attitude confirmation instruction to the mobile platform according to the confirmation operation. When the mobile platform receives the attitude confirmation instruction of the control terminal, the attitude sensors may be called to obtain the current attitude data of the mobile platform, and the obtained current attitude data may be used as the attitude data corresponding to the current trajectory point. The trajectory point may be stored in a database in association with the current attitude data, and the specific storage form may include "the attitude data of the first trajectory point is XX." Using the above method, the mobile platform can set and store multiple sets of correspondence relationships between trajectory points and attitude data.

Figure 4:
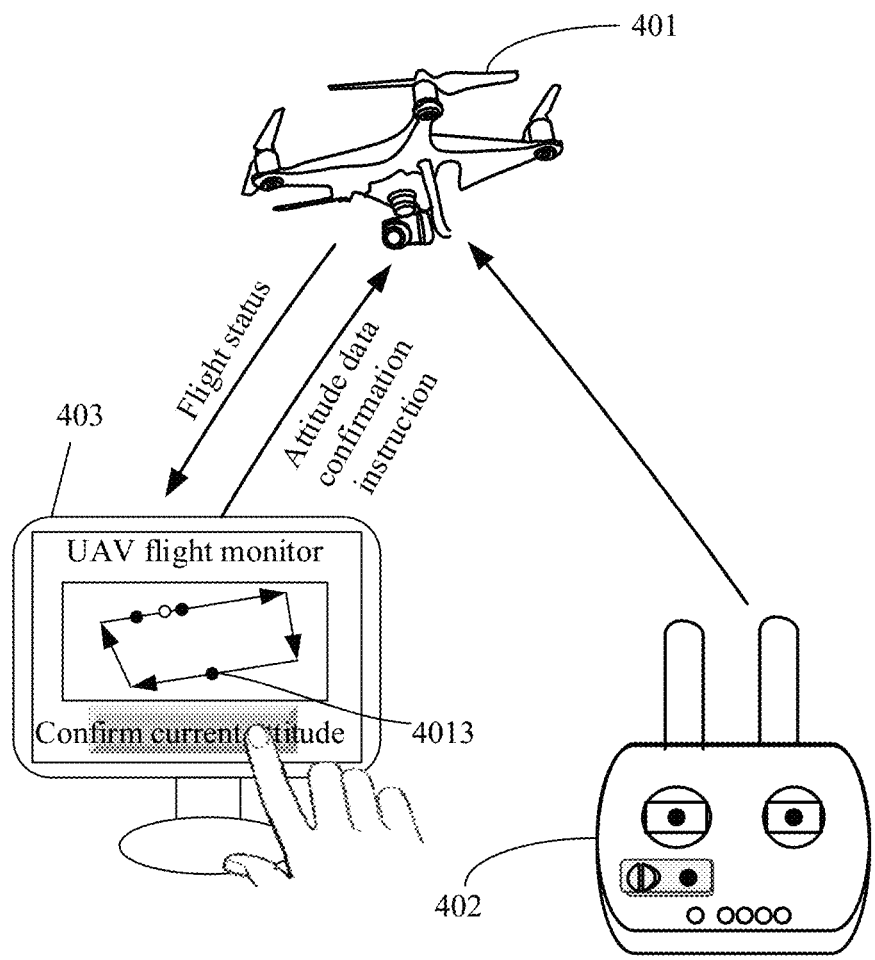
FIG. 4 shows an exemplary method for setting a relationship between trajectory points and attitude data consistent with various embodiments of the present disclosure.

FIG. 4 shows an exemplary method for setting the attitude data of a mobile platform for each trajectory point provided by one embodiment of the present disclosure. In FIG. 4, it is assumed that the mobile platform is an unmanned aerial vehicle 401, and the remote control device matching the unmanned aerial vehicle 401 is a remote control. The control terminal is a terminal 403 with a display screen. The trajectory points of the unmanned aerial vehicle pre-set by the terminal 403 is shown by the black solid circles 4031 in the terminal 403. The user controls the unmanned aerial vehicle 401 to fly through the remote control 402. The specific flight status of the unmanned aerial vehicle 401 is displayed on the display screen of the terminal 403 (the white solid circle in the terminal 403 represents the location of the unmanned aerial vehicle). When the user observes that the unmanned aerial vehicle 401 arrives at a first trajectory point of the preset trajectory points, the user can adjust the attitude of the unmanned aerial vehicle 401 at the first trajectory point through the remote control 402. For example, the user can control the unmanned aerial vehicle to rotate upward by 30° through the remote control. In the present embodiment, the user controls the attitude of the unmanned aerial vehicle 4001 at the first trajectory point through the remote controller 402 to achieve that the image captured by the photographing device of the unmanned aerial vehicle 401 when the unmanned aerial vehicle 4010 is in an attitude includes what the user expects to be photographed. After the user adjusts the attitude of the unmanned aerial vehicle 401 at the first trajectory point, the user can perform the confirmation operation through the remote control 402 or the terminal 403. In some embodiments, the user enters the confirmation operation through the terminal 403. When the terminal 403 receives the user's confirmation operation, based on the confirmation operation, the terminal 403 sends the attitude confirmation instruction to the unmanned aerial vehicle 401. At this time, the unmanned aerial vehicle 401 calls the attitude sensors to obtain the current attitude data of the unmanned aerial vehicle 401, and uses the current attitude data as the attitude data corresponding to the first trajectory point.

For description purposes only, the embodiment in FIG. 4 with the manner to set the correspondence relationship between the trajectory points and the attitude data is used as an example to illustrate the present disclosure, and does not limit the scope of the present disclosure. The present disclosure has no limit on the manners to set the correspondence relationship between the trajectory points and the attitude data.

At S303, for one trajectory point of the at least one trajectory point, the correspondence relationship between the photographing parameters for the trajectory point and the attitude data for the trajectory point is established.

In one embodiment, during the operation of the mobile platform, the user can observe at which trajectory point the mobile platform arrives through the display device of the control terminal. However, the mobile platform cannot directly determine at which trajectory point the mobile platform currently arrives according to the operating situation, but can only at which trajectory point the mobile platform currently arrives according to the attitude of the mobile platform. Specifically, the mobile platform can detect the operation attitude of the mobile platform in real time when it is operating, and determine whether the mobile platform currently arrives at a preset trajectory point through the correspondence relationship between the pre-stored operation attitudes and the trajectory points.

In one embodiment, the method for dynamically adjusting the photographing parameters of the photographing device of the mobile platform is to set different photographing parameters for different trajectory points of the mobile platform. When the mobile platform runs to a certain trajectory point, the photographing device is controlled to photograph with the photographing parameters corresponding to the trajectory point. When the mobile platform searches for the photographing parameters corresponding to the trajectory point according to the trajectory point, it first needs to determine the trajectory point where the mobile platform is currently located according to the correspondence relationship between the trajectory points and the attitude data. After the current trajectory point is determined, based on the correspondence relationship between the trajectory points and the attitude data, the photographing parameter corresponding to the current trajectory point is determined. In one embodiment, to simplify the above operations and improve the photographing efficiency, the mobile platform may establish the correspondence relationship between the photographing parameters of the at least one trajectory point and the attitude data after receiving the photographing parameters of the at least one trajectory point and obtaining the attitude data of the at least one trajectory points. Correspondingly, the mobile platform can directly determine the photographing parameters of the photographing device when photographing according to the current operation attitude.

In one embodiment, for one trajectory point of the at least one trajectory point, establishing the correspondence relationship between photographing parameters for the trajectory point and the attitude data for the trajectory point may include: obtaining the attitude data for the trajectory point, obtaining the photographing parameters for the trajectory point, and storing the attitude data and the photographing parameters correspondingly. For example, the attitude data of one trajectory point is "the angle in the horizontal direction is 30°, the angle in the vertical direction is 60°," and the photographing parameters for the trajectory point are "the focus is XX, the focal length is XX, and the exposure value is XX." The correspondence relationship between the attitude data and the photographing parameters is "when the attitude is the angle of 30° in the horizontal direction and the angle of 60° in the vertical direction, the photographing parameters include the focus of XX, a focal length of XX, and exposure value of XX."

At S304, when it is detected that the current operation attitude of the mobile platform matches the target attitude data, the photographing device is controlled to photograph with the photographing parameters corresponding to the target attitude data.

In one embodiment, during the photographing process of the photographing device controlled by the mobile platform, the mobile platform may monitor and obtain the current operation attitude of the mobile platform in real time. The mobile platform may then compare the obtained current operation attitude with each attitude data in the database. When the current operation attitude is successfully matched with one target attitude data in the database, it may indicate that the current operating position of the mobile platform is one trajectory point among the at least one trajectory point, and the mobile platform may determine the photographing parameters corresponding to the target attitude data according to the correspondence relationship between the attitude data and the photographing parameters established at S303, and then control the photographing device to photograph with the photographing parameters corresponding to the target attitude.

In one embodiment, the mobile platform also includes the motor that can adjust the photographing parameters of the photographing device when receiving an adjustment instruction, in addition to the photographing device and the gimbal for stabilizing the photographing device. Therefore, at S304, a feasible implementation for controlling the photographing device to perform photographing with the photographing parameters corresponding to the target attitude data may be: sending a first photographing parameter adjustment instruction to the motor according to the photographing parameters corresponding to the target attitude data, such that the motor adjusts the photographing parameters of the photographing device according to the first photographing parameter adjustment instruction; controlling the photographing device to perform photographing based on the adjusted photographing parameters. The first photographing parameter adjustment instruction may be used to instruct the motor to perform one or more of the following operations: adjusting the focus of the photographing device to a target focus, adjusting the focal length of the photographing device to a target focal length, or adjusting the exposure value of the photographing device to a target exposure value.

The target focus, target focal length, and target exposure value may refer to the focus, the focal length, and the exposure value included in the photographing parameters corresponding to the target attitude data. In the following description, the target focus, target focal length, and target exposure value are referred to as target photographing parameters. The first photographing parameter adjustment instruction sent to the motor by the mobile platform may include adjustment parameters corresponding to the first photographing parameter adjustment instruction, and the adjustment parameters corresponding to the first photographing parameter adjustment instruction may include one or more of adjustment focus, adjustment focal length, or adjustment exposure value. The adjustment parameters corresponding to the first photographing parameter adjustment instruction may be determined by the mobile platform according to the current photographing parameters of the photographing device and the target photographing parameters. In one embodiment, the motor may directly control the photographing parameters of the photographing device. For example, the motor may be connected to photographing parameter adjustment components of the photographing device through a hard wire, and the motor may control the photographing parameter adjustment components to change through the hard wire to adjust the photographing parameters of the photographing device. In this case, the manner in which the mobile platform determines the adjustment parameters corresponding to the first photographing parameter adjustment instruction according to the current photographing parameters of the photographing device and the target photographing parameters may be: for a same photographing parameter, calculating difference information between the target photographing parameter and the current photographing parameter; and determining the adjustment parameter corresponding to the first photographing parameter adjustment instruction according to the difference information. The difference information may include the difference between the target photographing parameter and the current photographing parameter or the same photographing parameter. For example, assuming that for the focal length, the target focal length is 20 mm and the current focal length is 15 mm, then the adjustment focal length is 5 mm.

In other embodiments, the motor may also control the photographing device to adjust the photographing parameters through an indirect control method. For example, a photographing parameter adjustment component may be provided at the motor, and the photographing parameter adjustment component at the motor may be connected to the photographing parameter adjustment component of the photographing device through a hard wire. After the motor receives the photographing parameter adjustment instruction of the mobile platform, the motor may first control the photographing parameter adjustment component to rotate, driving the photographing parameter adjustment component of the photographing device to change to complete the photographing parameter adjustment of the photographing device. In this case, the manner in which the mobile platform determines the adjustment parameters corresponding to the first photographing parameter adjustment instruction according to the current photographing parameters of the photographing device and the target photographing parameters may be: according to a proportion relationship between the photographing device and the motor, the current photographing parameters, and the target photographing parameters, determining the adjustment parameters corresponding to the first photographing parameter adjustment instruction.

The proportion relationship between the photographing device and the motor may be understood as that when the photographing parameter adjustment component of the photographing device causes a photographing parameter to change by one unit, the photographing parameter adjustment component on the motor should cause the corresponding photographing parameter to change by several units. In other words, it can also be understood that in the case of directly adjusting the photographing parameters by controlling the photographing device, when the photographing device increases or decreases a certain photographing parameter by one unit, the motor may control the photographing parameter adjustment component at the motor to increase or decrease the photographing parameters by several units. For example, assuming that the correspondence relationship between the photographing device and the motor is 2:1 when adjusting the focal length, it can be understood that for the focal length, if the photographing parameter adjustment component of the photographing device increases the focal length by 4 mm, the photographing parameter adjustment component at the motor should cause the focal length to increase by 2 mm.

In one embodiment, the proportion relationship between the photographing device and the motor may be determined based on the physical structure of the photographing device and the performance of the motor. In other embodiments, the proportion relationship may also be configured based on other factors. Adjusting the photographing parameters of the photographing device through the above method takes into account the performance of the photographing device and the motor itself to ensure the accuracy of adjustment.

In one embodiment, at S304, another implementation of controlling the photographing device to photograph with the photographing parameters corresponding to the target attitude data may include: sending the photographing parameters corresponding to the target attitude data to the photographing device, such that the photographing device changes the current photographing parameters to the photographing parameters corresponding to the target attitude data; and controlling the photographing device to photograph with the adjusted photographing parameters. That is, the mobile platform may directly send the photographing parameters corresponding to the target attitude data to the photographing device, such that the photographing device changes the current photographing parameters to the photographing parameters corresponding to the target attitude data automatically. Correspondingly, the photographing device may be controlled to photograph with the adjusted photographing parameters.

Figure 5:
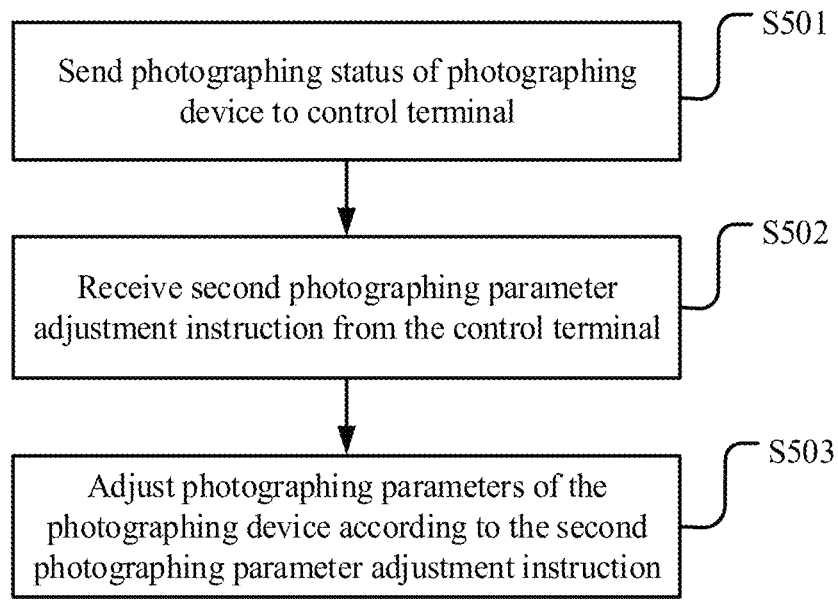
FIG. 5 is a flow chart of another exemplary photographing control method consistent with various embodiments of the present disclosure.

In one embodiment, after S304, during the photographing device performs photographing, the mobile platform may monitor the photographing status of the photographing device, and send the photographing status to the control terminal such that the control terminal can adjust the photographing parameters according to the photographing status. Specifically, in one embodiment, the method that the control terminal uses to adjust the photographing parameters according to the photographing status includes S501 to S503 shown in FIG. 5. At S501, the photographing status of the photographing device is sent to the control terminal. At S502, a second photographing parameter adjustment instruction sent by the control terminal is received. The second photographing parameter adjustment instruction is determined by the control terminal when a photographing parameter adjustment operation is detected. At S503, the photographing parameters of the photographing device are adjusted according to the second photographing parameter adjustment instruction. The mobile platform may send the photographing status of the photographing device to the control terminal, and the control terminal may display the photographing status to the user through the display device such that the user can determine whether it is necessary to adjust the current photographing parameters of the photographing device based on the photographing status. When it is determined that the current photographing parameters of the photographing device need to be adjusted, the user may perform the adjustment operation through the control terminal, and the control terminal may instruct the mobile platform to adjust the current photographing parameters based on the adjustment operation. When it is determined that the current photographing parameters of the photographing device do not need to be adjusted, the user may not perform operations.

In one embodiment, the mobile platform adjusts the photographing parameters of the photographing device based on the second photographing parameter adjustment instruction may include two situations. One situation is that when the photographing device is in the process of photographing, the mobile platform may adjust the current photographing parameters of the photographing device based on the second photographing parameter adjustment instruction. Another one is that when the photographing of the photographing device is completed, the mobile platform may update the correspondence between the attitude data for some of the trajectory points and the photographing parameters based on the second photographing parameter adjustment instruction. Correspondingly, when the mobile platform continues to photograph according to the configured trajectory points, if the operation attitude of the mobile platform matches attitude data with updated correspondence, the mobile platform may control the photographing device to photograph with the photographing parameters corresponding to the attitude data according to the updated correspondence.

In one embodiment, whether the mobile platform is in the process of photographing or the photographing is completed can be determined by monitoring the photographing status of the mobile platform. The photographing status may include the photographing progress, and the photographing progress can be used to notify the mobile platform whether the photographing is complete. Optionally, in one embodiment, the photographing device may be mainly used to perform time-lapse photography. In this case, the photographing progress may be related to the setting of the photographing device by the control terminal in advance. The setting of the photographing device may include one or more of setting the sensor size of the photographing device, setting the time interval of time-lapse photographing, setting the frame rate of the photographed image, setting the time-lapse photographing time or other information. Specifically, the photographing progress may be related to the preset time-lapse photographing time. In one embodiment, the mobile platform may compare the current photographed time with the preset time-lapse photographing time to determine the photographing progress. In one embodiment, the photographing progress may be expressed as a percentage of progress. For example, the photographing progress is 50%, which means that the photographing is half completed. In another embodiment, the photographing progress can also be expressed in the form of the ratio of the completion time to the total time. For example, the photographing progress is 20 minutes/60 minutes, indicating that the preset time-lapse photographing time is 60 minutes, and 20 minutes have been photographed so far.

In one embodiment, the second photographing parameter adjustment instruction may include the trajectory points whose photographing parameters need adjustment and corresponding adjustment parameters. When the photographing progress in the photographing status indicates that the photographing device completes photographing, adjusting the photographing parameters of the photographing device according to the second photographing parameter adjustment instruction at S403 may include: updating the photographing parameters corresponding to the attitude data for the trajectory points whose photographing parameters need adjustment according to the second photographing parameter adjustment instruction; and in the process of passing through each trajectory point again, if the current operation attitude of the mobile platform matches the attitude data for the trajectory point whose photographing parameters need adjustment, controlling the photographing device to photograph according to the photographing parameters corresponding to the trajectory point whose photographing parameters need adjustment after updating. The process of passing through each trajectory point again may mean that after the photographing device completes time-lapse photographing once, and after the mobile platform updates the photographing parameters corresponding to the attitude data for the trajectory points whose photographing parameters need adjustment, the photographing device again photographs according to the original trajectory points.

For example, it is assumed that the photographing parameter corresponding to the target attitude data in the correspondence relationship between the attitude data and the photographing parameters established by the mobile platform based on S301 to S303 is "60 degrees in the horizontal direction and 30 degrees in the vertical direction." When the photographing device is controlled to complete photographing according to the above correspondence relationship, the mobile platform receives the second photographing parameter adjustment instruction for the target trajectory point corresponding to the target attitude data, and the target trajectory point is the trajectory point whose photographing parameter needs to be adjusted. Assuming that the second photographing parameter adjustment instruction includes the adjustment parameters of "45 degrees in the horizontal direction and 20 degrees in the vertical direction," the mobile platform will change the correspondence between the target attitude data of the target trajectory point and the photographing parameters from "60 degrees in the horizontal direction and 30 degrees in the vertical direction" to "45 degrees in the horizontal direction and 20 degrees in the vertical direction." After updating the correspondence between the target attitude data of the target trajectory point and the photographing parameters, the mobile platform moves according to the same trajectory points as the original to complete the control of the photographing device for photographing. When it is detected again that the operation attitude of the mobile platform matches the target attitude data, the mobile platform controls the photographing device to photograph according to the photographing parameters corresponding to the updated target attitude data, that is, "45 degrees in the horizontal direction and 20 degrees in the vertical direction."

In another embodiment, when the photographing progress in the photographing status indicates that the photographing device is in the photographing process, adjusting the photographing parameters of the photographing device according to the second photographing parameter adjustment instruction at S403 may include: adjusting the current photographing parameters of the photographing device to the adjustment parameters such that the photographing device performs photographing using the adjustment parameters. That is, when the photographing device receives the second photographing parameter adjustment instruction during photographing, the current photographing parameters may be adjusted according to the second photographing parameter adjustment instruction, such that the adjustment of the photographing parameters according to the photographing status may be achieved.

In one embodiment, when the photographing device is controlled to photograph according to the photographing parameters corresponding to the target attitude data at S304, the mobile platform may move from one trajectory point to another trajectory point in a constant speed. Specifically, controlling the photographing device to photograph according to the photographing parameters corresponding to the target attitude data may include: obtaining a first trajectory point and a second trajectory point of the mobile platform where the first trajectory point and the first trajectory point are trajectory points belonging to the at least one trajectory point; determining a reference trajectory point and the photographing parameters corresponding to the reference trajectory point where the photographing parameter corresponding to the reference trajectory point is greater than the photographing parameter of the first trajectory point and smaller than the photographing parameter of the second trajectory point (i.e., the value of the photographing parameter for the reference trajectory point is greater than the value of the photographing parameter for the first trajectory point and smaller than the value of the photographing parameter for the second trajectory point); in the process of moving from the first trajectory point to the second trajectory point through the reference trajectory point, controlling the photographing device to perform photographing according to the photographing parameters corresponding to the first trajectory point, the photographing parameters corresponding to the reference trajectory point and the photographing parameters corresponding to the second trajectory point.

The first trajectory point and the second trajectory point may be trajectory points belonging to the at least one trajectory point. The first trajectory point and the second trajectory point may be adjacent trajectory points, and there may be no other trajectory point belonging to the at least one trajectory point between the first trajectory point and the second trajectory point. That is, during the operation of the mobile platform, after passing the first trajectory point, it then may move to the second trajectory point. The reference trajectory point may be a trajectory point in the middle of the trajectory between the first trajectory point and the second trajectory point. The photographing parameters corresponding to the reference trajectory point may be larger than the photographing parameters corresponding to the first trajectory and smaller than the photographing parameters corresponding to the second trajectory point.

In one embodiment, in addition to setting the at least one trajectory point for the mobile platform to move, the control terminal may also set the operating time required for the mobile platform to run between two adjacent trajectory points, such that the mobile platform can control the mobile platform to operate at a constant rate between every two adjacent trajectory points based on the operating time. In the process of moving from the first trajectory point to the second trajectory point through the reference trajectory point, controlling the photographing device to perform photographing according to the photographing parameters corresponding to the first trajectory point, the photographing parameter corresponding to the reference trajectory point and the photographing parameter corresponding to the second trajectory point may include: the mobile platform moving at a constant speed from the first trajectory point to the second trajectory point. The mobile platform changing at a constant rate from the first trajectory point to the second trajectory point may include: the mobile platform moving at a constant speed, and the mobile platform controlling the photographing parameters of the photographing device to change at a constant rate from the photographing parameters corresponding to the first trajectory point to the photographing parameters corresponding to the second trajectory point.

For example, the photographing parameters corresponding to the first trajectory point of the mobile platform is "no translation in the horizontal direction and the horizontal angle of 60 degrees," and the photographing parameter of the second trajectory point is "translation of 6 cm in a preset direction of the horizontal direction and the horizontal angle of 120 degrees." Assuming that the time required for the mobile platform to move from the first trajectory point to the second trajectory point is 10 minutes, the manner that the mobile platform moving at a constant speed from the first trajectory point to the second trajectory point includes: translating along the preset direction at 1 cm per minute, and rotating the angle of the mobile platform in the horizontal direction at 6 degrees per minute.

By setting the mobile platform to change from the first trajectory point to the second trajectory point at a constant rate, large shaking of the mobile platform induced by a sudden movement of the mobile platform and influence on the photographing effect of the photographing device may be avoided.

In the present disclosure, after obtaining the photographing parameters of the at least one trajectory point and the attitude data of the at least one trajectory point, the mobile platform may establish the correspondence relationship between the photographing parameters of the at least one trajectory point and the attitude data of the at least one trajectory point, and may monitor the current operation attitude of the mobile platform. The current operation attitude may be compared with the attitude data of the at least one trajectory point. When the current operation attitude is matched with target attitude data among the attitude data of the at least one trajectory point, the photographing device may be controlled to photograph using the photographing parameters corresponding to the target attitude data. Dynamic adjustment of the photographing parameters of the photographing device may be achieved and the photographing efficiency may be improved.

Figure 6:
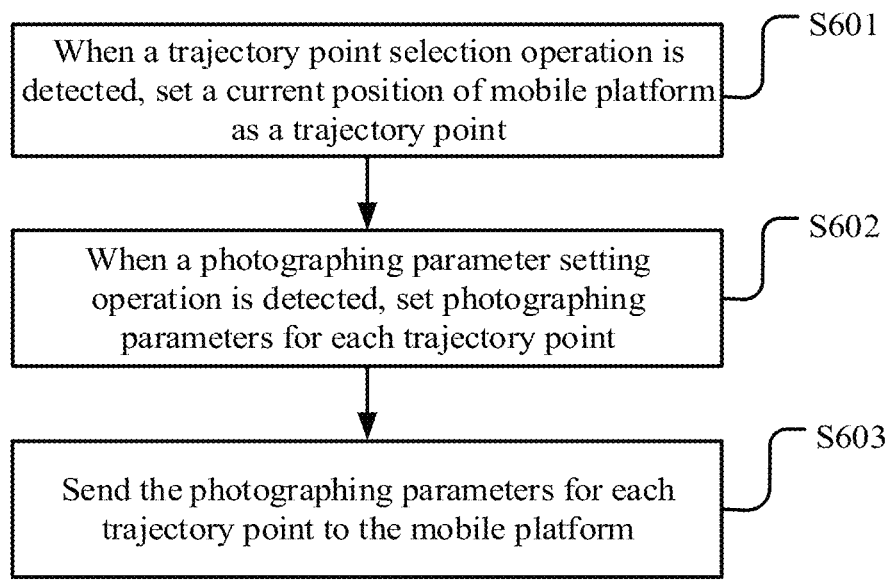
FIG. 6 is a flow chart of another exemplary photographing control method consistent with various embodiments of the present disclosure.

Another embodiment shown in FIG. 6 of the present disclosure also provides another photographing control method. The photographing control method can be applied to the photographing control system in FIG. 1 and also can be applied to the workflow of the photographing control system shown in FIG. 2. The photographing control method can be executed by the control device, and includes S601 to S603.

At S601, when a trajectory point selection operation is detected, the current position of the mobile platform is set as a trajectory point of the trajectory points. A number of the trajectory point may be at least one.

In one embodiment, the control terminal may set the at least one trajectory point for the mobile platform. The control terminal may set the at least one trajectory point for the mobile platform by: controlling the mobile platform to perform video view finding by the user; and when it is detected that the mobile platform arrives at a target position, receiving a trajectory point selection operation performed by the user; and after receiving the trajectory point selection operation performed by the user, the control terminal setting the target position as one trajectory point of the at least one trajectory point of the mobile platform. The user may control the mobile platform to move by using a remote control device paired with the mobile platform, and use the display device of the control terminal to monitor the moving status of the mobile platform. The at least one trajectory point may be set by the control terminal through the above method. The trajectory point selection operation may refer to one or more of a clicking operation, a pressing operation, or a sliding operation performed by the user at a preset position of the control terminal.

At S602, when a photographing parameter setting operation about each trajectory point is detected, the photographing parameters corresponding to the trajectory point are set.

In one embodiment, after the control terminal set the at least one trajectory point, the control terminal may receive the photographing parameter setting operation about each trajectory point of the at least one trajectory point from the user, and then set the photographing parameters corresponding to the trajectory point according to the photographing parameter setting operation. The photographing parameter setting operation may refer to one or more of operations such as sliding, clicking, and pressing performed by the user at a preset position.

In one embodiment, the control terminal may set the corresponding photographing parameters for each trajectory point according to the photographing parameter setting operation by: when the control terminal receives the user's trajectory point selection operation, displaying a photographing parameter setting window corresponding to the trajectory point through which the user performs the photographing parameter setting operation, and setting the photographing parameter corresponding to the trajectory point according to the user's photographing parameter setting operation.

Figure 7:
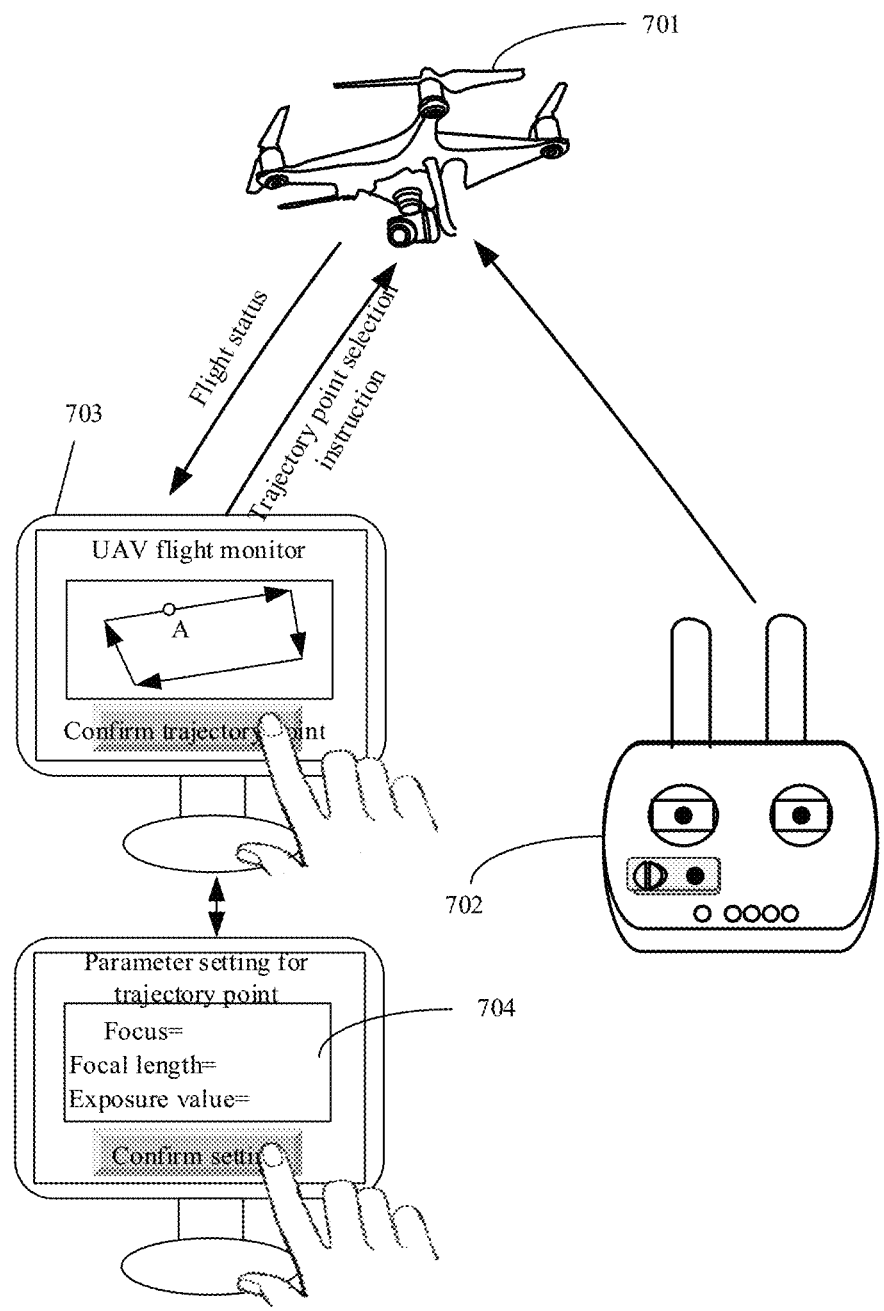
FIG. 7 shows an exemplary method for setting a relationship between trajectory points and photographing parameters consistent with various embodiments of the present disclosure.

For example, FIG. 7 is a schematic diagram showing a method for a control terminal to set the trajectory point and corresponding photographing parameters according to one embodiment. As shown in FIG. 7, the user uses a remote control device 702, such as a remote controller, paired with the mobile platform 701 (an unmanned aerial vehicle 701 will be used as an example), to control the operation of the mobile platform. At the same time, the unmanned aerial vehicle 701 sends the real-time operating status of the mobile platform to the control terminal 703, and the control terminal 703 displays the operating status data on the display screen. When the control terminal 703 receives the trajectory point selection operation performed by the user, for example, when the mobile platform moves to point A and the user performs the trajectory point selection operation, the control terminal 703 sets point A as a trajectory point, and displays the photographing parameter setting window 704 corresponding to the trajectory point. The photographing parameter setting window may include one or more of focus setting, focal length parameter setting, or exposure value parameter setting. Assuming the user enters the focus, focal length, and exposure value in the photographing parameter setting window, and clicks to confirm the setting, that is, the user performs the photographing parameter setting operation, the control terminal uses the photographing parameters corresponding to the photographing parameter setting operation as the photographing parameter corresponding to the trajectory point.

At S603, the photographing parameters corresponding to the trajectory point are sent to the mobile platform.

In one embodiment, the control terminal may send the at least one trajectory point and the correspondence relationship to the mobile platform, such that the mobile platform can dynamically adjust the photographing parameters of the photographing device.

In one embodiment, when the mobile platform controls the photographing device to start photographing, the control terminal may be further configured to: receive the photographing status of the photographing device detected by the photographing device; display the photographing status; and when the photographing parameter adjustment operation performed in response to the photographing status is detected, send a second photographing parameter adjustment instruction to the mobile platform, such that the mobile platform can adjust the photographing parameters according to the second photographing parameter adjustment instruction. The photographing parameter adjustment operation detected by the control terminal may be an operation for instructing to adjust the photographing parameters.

In one embodiment, the control terminal may also set that the setting operation for setting the photographing device of the mobile platform to perform time-lapse photographing includes an operation for instructing the control terminal to set the time-lapse photographing duration. The control terminal may set the time-lapse photographing duration of the mobile platform in accordance with the setting operation. In another embodiment, the setting operation may further include one or more of setting the sensor size of the photographing device, setting the time interval of time-lapse photographing or setting the frame rate of the captured image. The control terminal may set one or more of the sensor size the photographing device the time interval of time-lapse photographing, or frame rate of captured images according to the setting operation.

In the present disclosure, the control terminal may establish the correspondence relationship between each trajectory point and the photographing parameter according to the user's trajectory point selection operation and photographing parameter setting operation, and then send the trajectory point and its corresponding photographing parameter to the mobile platform, such that the mobile platform can control the photographing device to dynamically adjust the photographing parameters during the photographing process. Correspondingly, it may be ensured that the image captured by the photographing device meets the expected effect and the photographing efficiency may be improved.

Figure 8:
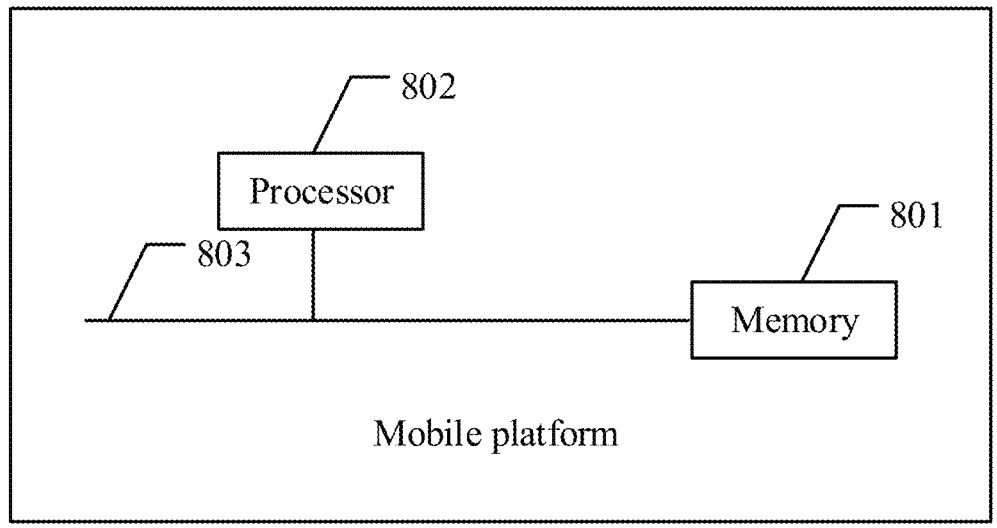
FIG. 8 is a schematic structural diagram of an exemplary mobile platform consistent with various embodiments of the present disclosure.

The present disclosure also provides a mobile platform. As illustrated in FIG. 8, the mobile platform provided by one embodiment includes a memory 801 and a processor 802. The memory 801 and the processor 802 are connected through a bus 803. Program codes are stored in the memory, and the processor 802 is configured to call the program codes in the memory 801 to perform a method consistent with the disclosure, such as one of the above-described example methods.

The memory 801 may include a volatile memory volatile memory such as a random-access memory (RAM). The memory 801 may also include a non-volatile memory, such as a flash memory, a solid-state drive (SSD). The memory 801 may also include a combination of the above-described memories.

The processor 802 may be a central processing unit (CPU). The processor 802 may further include a hardware chip. The hardware chip may be an application-specific integrated circuit (ASIC), or a programmable logic device (PLD). The PLD may be a field-programmable gate array (FPGA), or a general array logic (GAL). The processor 802 may also be a combination of the foregoing structures.

The memory 801 may be configured to store a computer program, and the computer program may include program instructions. The processor 802 may be configured to execute the program instructions stored in the memory 801 to implement the photographing control method provided by various embodiments of the present disclosure.

When the program code is executed, the processor 802 may execute operations including: receiving the photographing parameters corresponding to the at least one trajectory point sent by the control terminal; obtaining the attitude data corresponding to each trajectory point of the at least one trajectory point of the mobile platform; for each trajectory point of the at least one trajectory point, establishing the correspondence relationship between the photographing parameters for the trajectory point and the attitude data for the trajectory point; and when the current operation attitude of the mobile platform is detected to match the target attitude data of the attitude data of the at least one trajectory point, controlling the photographing device to photograph using the photographing parameters corresponding to the target attitude data.

Optionally, in one embodiment, when the processor 802 obtains the attitude data corresponding to each trajectory point of the at least one trajectory point of the mobile platform, the processor 802 may obtain the attitude data of the mobile platform corresponding to each trajectory point of the at least one trajectory point through the attitude sensors. Each trajectory point of the at least one trajectory point may be determined when the control terminal detects the trajectory point selection operation.

Optionally, in one embodiment, when the processor 802 controls the photographing device to photograph using the photographing parameters corresponding to the target attitude data, the processor 802 may perform operations including: sending the first photographing adjustment instruction to the motor according to the photographing parameters corresponding to the target attitude data, such that the motor adjusts the photographing parameters of the photographing device according to the first photographing parameter adjustment instruction; and controlling the photographing device to photograph using the adjusted photographing parameters.

The first photographing parameter adjustment instruction may be configured to instruct the motor to perform one or more operations including: adjusting the focus of the photographing device to the target focus, adjusting the focal length of the photographing device to the target focal length, or adjusting the exposure value of the photographing device to the target exposure value.

Optionally, in one embodiment, when the processor 802 controls the photographing device to photograph using the photographing parameters corresponding to the target attitude data, the processor 802 may perform operations including: sending the photographing parameters corresponding to the target attitude data to the photographing device, such that the photographing device adjusts the current photographing parameters to the photographing parameters corresponding to the target attitude data; and controlling the photographing device to photograph using the adjusted photographing parameters.

Optionally, in one embodiment, the photographing parameters corresponding to the target attitude data may include one or more of focus, focal length or exposure value.

Optionally, in one embodiment, when the program code is executed, the processor 802 may send the photographing status of the photographing device to the control terminal, receive the second photographing parameter adjustment instruction sent by the control terminal which is determined by the control terminal when the control terminal detects the photographing parameter adjustment operation, and adjust the photographing parameters of the photographing device according to the second photographing parameter adjustment instruction.

Optionally, in one embodiment, the second photographing adjustment instruction may include the trajectory points whose photographing parameters need adjustment and the corresponding adjustment parameters. The photographing status may include the photographing progress.

When the processor 802 adjusts the photographing parameters of the photographing device according to the second photographing parameter adjustment instruction, the processor 802 may perform the operations including: when the photographing progress in the photographing status indicates that the photographing device completes photographing, updating the photographing parameters corresponding to the attitude data for the trajectory points whose photographing parameters need adjustment according to the second photographing parameter adjustment instruction; and in the process of passing through each trajectory point again, if the current operation attitude of the mobile platform matches the attitude data for the trajectory point whose photographing parameters need adjustment, controlling the photographing device to photograph according to the photographing parameters corresponding to the trajectory point whose photographing parameters need adjustment after updating.

Optionally, in one embodiment, the second photographing adjustment instruction may include the adjustment parameters. When the processor 802 adjusts the photographing parameters of the photographing device according to the second photographing parameter adjustment instruction, the processor 802 may perform the operations including: when the photographing progress indicates that the photographing device is in the photographing process, adjusting the current photographing parameters of the photographing device to the adjustment parameters, such that the photographing device performs photographing using the adjustment parameters.

Optionally, in one embodiment, when the processor 802 controls the photographing device to photograph using the photographing parameters corresponding to the target attitude data, the processor 802 may perform the operations including: obtaining a first trajectory point and a second trajectory point of the mobile platform where the first trajectory point and the first trajectory point are trajectory points belonging to the at least one trajectory point; determining a reference trajectory point and the photographing parameters corresponding to the reference trajectory point where the photographing parameter corresponding to the reference trajectory point is greater than the photographing parameter of the first trajectory point and smaller than the photographing parameter of the second trajectory point; in the process of moving from the first trajectory point to the second trajectory point through the reference trajectory point, controlling the photographing device to perform photographing according to the photographing parameters corresponding to the first trajectory point, the photographing parameter corresponding to the reference trajectory point and the photographing parameter corresponding to the second trajectory point.

Figure 9:
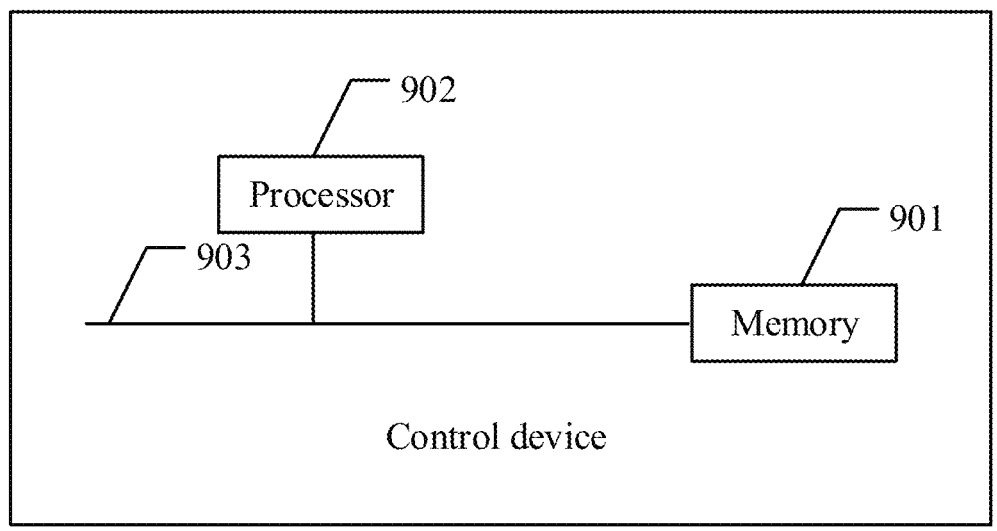
FIG. 9 is a schematic structural diagram of an exemplary control device consistent with various embodiments of the present disclosure.

The present disclosure also provides a control device. As illustrated in FIG. 9, in one embodiment, the photographing device includes a memory 901 and a processor 902. The memory 901 and the processor 902 are connected by a bus 903. The memory 901 is configured to store program codes, and the processor 902 is configured to call the program codes in the memory 901 to perform a method consistent with the disclosure, such as one of the above-described example methods.

The memory 902 may include a volatile memory, such as a random access memory (RAM). The memory 902 may also include a non-volatile memory, such as a flash memory or a solid state hard disk (SSD). The memory 902 may also include a combination of the foregoing memories.

The processor 902 may be a central processing unit (CPU). The processor 901 may further include a hardware chip. The aforementioned hardware chip may be an application specific integrated circuit (ASIC), or a programmable logic device (PLD). The PLD may be a field programmable logic gate array (FPGA) or a general-purpose array logic (GAL). The processor 901 may also be a combination of the foregoing structures.

In one embodiment, the memory 901 is configured to store a computer program, and the computer program includes program instructions. The processor 902 is configured to execute the program instructions stored in the memory 901 to implement the photographing control method provided by various embodiments of the present disclosure.

When the program codes are executed, the processor 902 is configured to: when a trajectory point selection operation is detected, set the current position of the mobile platform as a trajectory point of the trajectory points where a number of the trajectory point may be at least one; when a photographing parameter setting operation about each trajectory point is detected, set the photographing parameters corresponding to the trajectory point; and send the photographing parameters corresponding to the trajectory point to the mobile platform.

Optionally, in one embodiment, when the program codes are executed, the processor 902 may be further configured to: receiving the photographing status of the photographing device monitored by the mobile platform; displaying the photographing status; and when the photographing parameter adjustment operation responding to the photographing status is detected, sending the second photographing parameter adjustment instruction to the mobile platform.

Optionally, in one embodiment, when the program codes are executed, the processor 902 may be further configured to: detect the setting operation about the time-lapse photographing; and setting the photographing duration of the time-lapse photographing according to the setting operation.

In the embodiments provided by the present disclosure, it should be understood that the disclosed device and method can be implemented in other manners. For example, the device embodiments described above are merely illustrative. The division of the units is only a logical function division, and there may be other divisions in actual implementation, for example, multiple units or components may be combined or can be integrated into another system, or some features can be ignored or not implemented. Further, the shown or discussed mutual coupling or direct coupling or communication connection may be indirect coupling or communication connection through some interfaces, devices or units, and may be in electrical, mechanical or other forms.

The units described as separate components may or may not be physically separated, and the components shown as units may or may not be physical units, that is, they may be located in one place, or they may be distributed on multiple network units. Some or all of the units may be selected according to actual needs to achieve the objectives of the solutions of the embodiments. In addition, the functional units in the various embodiments of the present disclosure may be integrated into one processing unit, or each unit may exist alone physically, or two or more units may be integrated into one unit.

The above-mentioned integrated unit may be implemented in the form of hardware, or may be implemented in the form of hardware plus software functional units. The above-mentioned integrated unit implemented in the form of a software functional unit may be stored in a computer readable storage medium. The above-mentioned software functional unit is stored in a storage medium and includes several instructions to make a computer device (which may be a personal computer, a server, or a network device, etc.) or a processor execute some of the steps the method described in the various embodiments of the present disclosure. The aforementioned storage medium may include: a flash disk, a mobile hard disk, a read-only memory (ROM), a random access memory (RAM), a magnetic disk, an optical disk, or another medium that can store program code.

In this disclosure, terms such as "first" and "second" are only used to distinguish one entity or operation from another entity or operation, and do not necessarily require or imply existence of any such relationship or sequence among these entities or operations. The terms "include," "comprise" or any other variants thereof are intended to cover non-exclusive inclusion, so that a process, method, article, or device including a series of elements not only includes those elements, but also includes other elements not explicitly listed, or also includes elements inherent to such process, method, article, or device. If there are no more restrictions, the element associated with "including a . . . " does not exclude the existence of other identical elements in the process, method, article, or device that includes the element.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A photographing control method comprising:
   receiving, from a control terminal, a plurality of photographing parameters for a plurality of trajectory points for a mobile platform, the plurality of trajectory points including a first trajectory point and a second trajectory point, and the plurality of photographing parameters including a first photographing parameter for the first trajectory point and a second photographing parameter for the second trajectory point;
   obtaining mobile-platform attitude data for the plurality of trajectory points, the mobile-platform attitude data including first mobile-platform attitude data for the first trajectory point and second mobile-platform attitude data for the second trajectory point;
   in response to the mobile platform moving from the first trajectory point to the second trajectory point, controlling to adjust an operation attitude of the mobile platform from a first attitude corresponding to the first mobile-platform attitude data to a second attitude corresponding to the second mobile-platform attitude data; and
   controlling a photographing device of the mobile platform to gradually adjust a photographing parameter of the photographing device from the first photographing parameter to the second photographing parameter while the mobile platform moving from the first trajectory point to the second trajectory point.

2. The method according to claim 1, wherein:
   obtaining the mobile-platform attitude data for the plurality of trajectory points includes capturing the mobile-platform attitude data for the plurality of trajectory points through an attitude sensor; and one or more of the plurality of trajectory points are determined by the control terminal in response to detecting a trajectory point selection operation.

3. The method according to claim 1, wherein:
controlling the photographing device of the mobile platform to adjust the photographing parameter of the photographing device includes at least one of:
   adjusting a focus of the photographing device to a target focus;
   adjusting a focal length of the photographing device to a target focal length; or
   adjusting an exposure value of the photographing device to a target exposure value.

4. The method according to claim 1, wherein controlling the photographing device to adjust the photographing parameter of the photographing device includes:
sending a corresponding value of the second photographing parameter to the photographing device; and
controlling the photographing device to adjust the photographing parameter of the photographing device from a current value to the corresponding value.

5. The method according to claim 1, further comprising:
sending a photographing status of the photographing device to the control terminal;
receiving, from the control terminal, a photographing parameter adjustment instruction determined by the control terminal in response to detecting a photographing parameter adjustment operation; and
adjusting the photographing parameter of the photographing device according to the photographing parameter adjustment instruction.

6. The method according to claim 5, wherein:
the photographing parameter adjustment instruction further includes a target trajectory point of the plurality of trajectory points and an adjustment parameter corresponding to the target trajectory point;
the photographing status includes photographing progress; and
adjusting the photographing parameter of the photographing device according to the photographing parameter adjustment instruction includes:
   in response to the photographing progress indicating that the photographing device has completed photographing, updating a value of the photographing parameter corresponding to a piece of mobile-platform attitude data for the target trajectory point according to the photographing parameter adjustment instruction; and
   in a process of the mobile platform passing through the plurality of trajectory points again, controlling the photographing device to perform photographing with an updated value of the photographing parameter corresponding to the target trajectory point in response to the current operation attitude of the mobile platform matching the piece of mobile-platform attitude data for the target trajectory point.

7. The method according to claim 5, wherein:
the photographing parameter adjustment instruction further includes an adjustment parameter;
the photographing status includes photographing progress; and
adjusting the photographing parameter of the photographing device according to the photographing parameter adjustment instruction includes:
   in response to the photographing progress indicating that the photographing device is in a photographing process, adjusting the current photographing parameter to the adjustment parameter, such that the photographing device performs photographing with the adjustment parameter.

8. The method according to claim 1, further comprising:
controlling the photographing device to perform photographing according to the photographing parameter including:
   determining a reference trajectory point and a reference value of the photographing parameter corresponding to the reference trajectory point, the reference value of the photographing parameter being larger than a first value of the first photographing parameter and smaller than a second value of the second photographing parameter; and
   in a process of moving from the first trajectory point to the second trajectory point through the reference trajectory point, controlling the photographing device to perform photographing according to the first value of the first photographing parameter, the reference value of the photographing parameter, and the second value of the second photographing parameter.

9. The method according to claim 1, further comprising:
establishing a correspondence relationship between the plurality of photographing parameters and the mobile-platform attitude data.

10. The method according to claim 9, wherein:
the correspondence relationship includes a direct correspondence relationship indicating a value of one of the plurality of the photographing parameters in response to a specific attitude of the mobile platform for the each of the plurality of trajectory points;
the photographing parameter includes at least one of focus, a focal length, or an exposure value; and
the specific attitude of the mobile platform includes at least one of an angle, a translation distance, or an operation speed of the mobile platform in a horizontal direction and at least one of an angle, a translation distance, or an operation speed of the mobile platform in a vertical direction.

11. The method according to claim 1, further comprising:
controlling the photographing device of the mobile platform to adjust the photographing parameter of the photographing device at a constant rate from the first photographing parameter to the second photographing parameter.

12. The method according to claim 1, further comprising:
controlling the photographing device to perform photographing according to a current photographing parameter of the photographing device while the mobile platform moving from the first trajectory point to the second trajectory point, the current photographing parameter being gradually changed between the first photographing parameter and the second photographing parameter.

13. A mobile platform comprising:
a photographing device;
a memory storing program codes;
a motor; and
a processor configured to execute the program codes to:
   receive, from a control terminal, a plurality of photographing parameters for a plurality of trajectory points for the mobile platform, the plurality of trajectory points including a first trajectory point and a second trajectory point, and the plurality of photographing parameters including a first photographing parameter for the first trajectory point and a second photographing parameter for the second trajectory point;

obtain mobile-platform attitude data for the plurality of trajectory points, the mobile-platform attitude data including first mobile-platform attitude data for the first trajectory point and second mobile-platform attitude data for the second trajectory point;

in response to the mobile platform moving from the first trajectory point to the second trajectory point, control to adjust an operation attitude of the mobile platform from a first attitude corresponding to the first mobile-platform attitude data to a second attitude corresponding to the second mobile-platform attitude data;

control the photographing device to gradually adjust a photographing parameter of the photographing device from the first photographing parameter to the second photographing parameter while the mobile platform moving from the first trajectory point to the second trajectory point.

14. The mobile platform according to claim 13, wherein:
the processor is further configured to execute the program codes to capture the mobile-platform attitude data for the plurality of trajectory points through an attitude sensor; and
one or more of the plurality of trajectory points are determined by the control terminal in response to detecting a trajectory point selection operation.

15. The mobile platform according to claim 13, wherein:
the processor is further configured to execute the program codes to perform at least one of:
adjusting a focus of the photographing device to a target focus;
adjusting a focal length of the photographing device to a target focal length; or
adjusting an exposure value of the photographing device to a target exposure value.

16. The mobile platform according to claim 13, wherein the processor is further configured to execute the program codes to:
send a corresponding value of the second photographing parameter to the photographing device; and
control the photographing device to adjust the photographing parameter of the photographing device from a current value to the corresponding value.

17. The mobile platform according to claim 13, wherein the processor is further configured to execute the program codes to:
send a photographing status of the photographing device to the control terminal;
receive, from the control terminal, a photographing parameter adjustment instruction determined by the control terminal in response to detecting a photographing parameter adjustment operation; and
adjust the photographing parameter of the photographing device according to the photographing parameter adjustment instruction.

18. A control device comprising:
a memory storing program codes; and
a processor configured to execute the program codes to:
in response to detecting a trajectory point selection operation, set a current position of a mobile platform as a current trajectory point among a plurality of trajectory points, the plurality of trajectory points including a first trajectory point and a second trajectory point;
in response to detecting a photographing parameter setting operation for the plurality of trajectory points, set a plurality of photographing parameters each for a corresponding one of the plurality of trajectory points, the plurality of photographing parameters including a first photographing parameter for the first trajectory point and a second photographing parameter for the second trajectory point;
send the plurality of photographing parameters to the mobile platform; and
send an instruction to the mobile platform to instruct the mobile platform to:
in response to the mobile platform moving from the first trajectory point to the second trajectory point, control the mobile platform to adjust an operation attitude of the mobile platform from a first attitude to a second attitude; and
control a photographing device of the mobile platform to gradually adjust a photographing parameter of the photographing device from the first photographing parameter to the second photographing parameter while the mobile platform moving from the first trajectory point to the second trajectory point.

19. The control device according to claim 18, wherein the processor is further configured to execute the program codes to:
receive a photographing status of the photographing device detected by the mobile platform; and
display the photographing status.

20. The control device according to claim 19, wherein the processor is further configured to execute the program codes to:
detect a setting operation for a time-lapse photographing; and
set a duration of the time-lapse photographing according to the setting operation.

* * * * *